United States Patent
Rastegar

(10) Patent No.: US 11,183,713 B2
(45) Date of Patent: *Nov. 23, 2021

(54) FAST CHARGING HIGH ENERGY LITHIUM ION BATTERY (LIB) BASED POWER SYSTEMS FOR GUN-FIRED PROJECTILES

(71) Applicant: Omnitek Partners LLC, Ronkonkoma, NY (US)

(72) Inventor: Jahangir S Rastegar, Stony Brook, NY (US)

(73) Assignee: OMNITEK PARTNERS, LLC, Ronkonkoma, NY (US)

( * ) Notice: Subject to any disclaimer, the term of this patent is extended or adjusted under 35 U.S.C. 154(b) by 65 days.

This patent is subject to a terminal disclaimer.

(21) Appl. No.: 16/535,000

(22) Filed: Aug. 7, 2019

(65) Prior Publication Data

US 2020/0119405 A1   Apr. 16, 2020

Related U.S. Application Data

(60) Provisional application No. 62/715,761, filed on Aug. 7, 2018.

(51) Int. Cl.
| | |
|---|---|
| *H01M 10/0585* | (2010.01) |
| *H01M 4/04* | (2006.01) |
| *H01M 10/44* | (2006.01) |
| *H01M 10/0525* | (2010.01) |

(52) U.S. Cl.
CPC ..... *H01M 10/0585* (2013.01); *H01M 4/0447* (2013.01); *H01M 10/0525* (2013.01); *H01M 10/446* (2013.01)

(58) Field of Classification Search
CPC ............ H01M 6/30; H01M 6/32; H01M 6/36; H01M 6/38; H01M 6/385; H01M 6/52
See application file for complete search history.

(56) References Cited

U.S. PATENT DOCUMENTS 10,461,379 B2 * 10/2019 Rastegar ............ H01M 10/049

* cited by examiner

*Primary Examiner* — Maria Laios
*Assistant Examiner* — Bartholomew A Hornsby

(57) ABSTRACT

A method for fabricating a Lithium-Ion reserve battery, the method including: assembling an operational Lithium-ion battery having an anode, cathode, separator membrane between the anode and cathode and an electrolyte; charging the assembled Lithium-ion battery; disassembling the Lithium-ion battery by separating the anode, cathode and separator membrane and removing the electrolyte; rinsing and drying the disassembled cathode and anode; reassembling the rinsed and dried cathode and anode with a new separator membrane between the anode and cathode and without the electrolyte to provide the Lithium-Ion reserve battery; and discharging the Lithium-Ion reserve battery.

4 Claims, 12 Drawing Sheets

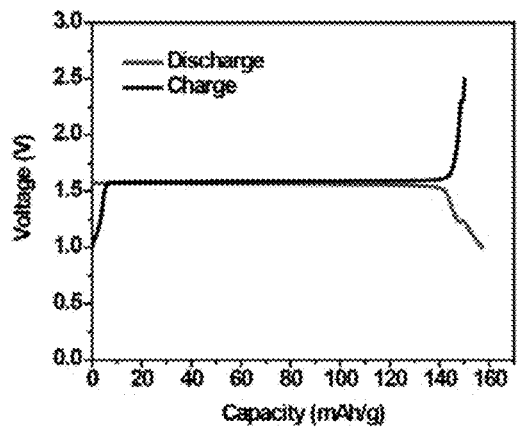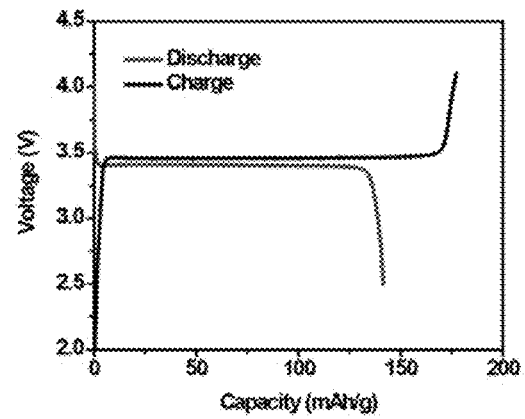
Figure 11     Figure 12
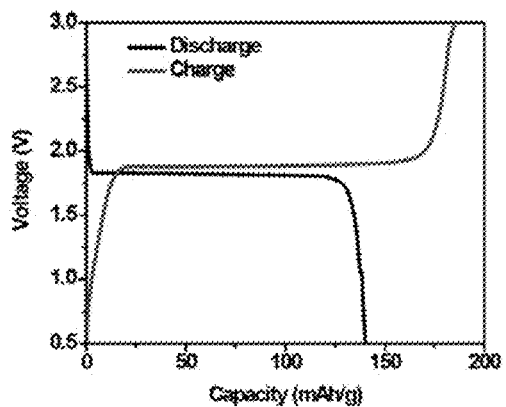
Figure 13
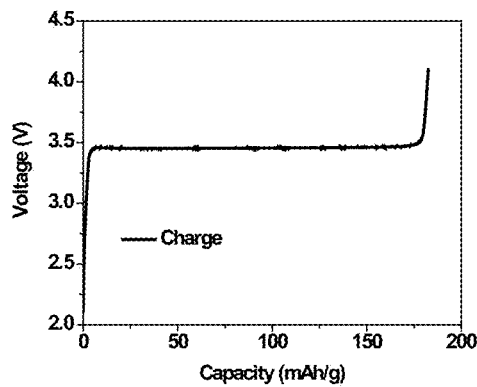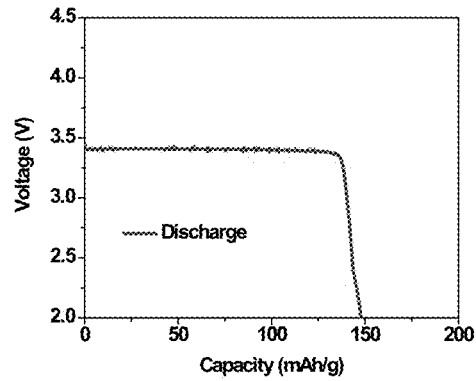
Figure 14

FAST CHARGING HIGH ENERGY LITHIUM ION BATTERY (LIB) BASED POWER SYSTEMS FOR GUN-FIRED PROJECTILES

CROSS REFERENCE TO RELATED APPLICATION

This application claims priority to U.S. Provisional Application No. 62/715,761, filed on Aug. 7, 2018, the entire contents of each of which is incorporated herein by reference.

GOVERNMENT RIGHTS

This invention was made with Government support under contract W15QKN-16-C-0026 awarded by the United States Army. The Government may have certain rights in the invention.

BACKGROUND

1. Field

The present invention relates generally to power systems and more particularly to fast charging high energy lithium ion battery (lib) based power systems for gun-fired projectiles.

2. Prior Art

In addition to safety issues, lithium ion batteries have two basic low temperature operational shortcomings for use in weapon platforms, military vehicles and other mobile and stationary platforms. Firstly, current lithium ion battery technology does not allow battery charging at temperatures of below zero degrees C. Secondly, lithium ion battery performance is significantly degraded at low temperatures, particularly at temperatures below −10 to −20 degrees C.

Current lithium ion batteries (LIB) employ a graphite anode and a metal oxide cathode, which are separated by a microporous polymer membrane impregnated with lithium salts dissolved in organic solvents. The most widely used cathode at present is lithium cobalt oxide ($LiCoOR_2R$), though many other cathode materials have emerged during the last decade. The current LIB is safer than the old version of lithium batteries based on a lithium metal anode, because no pure lithium (which is a strong fire hazard) is involved in the battery's chemistry. The charge/discharge mechanism is based on movement of lithium ions in and out of the electrode materials without disintegrating their structures (intercalation). Nevertheless, commercial LIBs can still catch fire from time to time and their safety issues still need to be addressed.

The safety concern of LIB is mainly when cells undergo thermal runaway under extreme or unreasonable conditions. Such conditions include thermal abuse (overheating), mechanical abuse (crushing, vibration, etc.) and electrical abuse (overcharge, external/internal short, etc.). Thermal runaway is an exothermic reaction mechanism that accelerates a rise in temperature in stages. The presence of highly active electrodes and a flammable electrolyte component triggers a hazardous incident (fire or explosion) when the temperature rises above the critical point (approximately 180° C.) by thermal runaway.

Current lithium ion batteries cannot be charged at temperatures below zero degrees C. In addition, their performance is significantly reduced at low temperatures, even if the operating temperature is not as low as the required −55 degrees C., but only −20 or 30 degrees C. These characteristics of lithium ion batteries, in addition to their safety issues, greatly limit their application in military platforms, such as weapon platforms, vehicles and unmanned mobile platforms as well as for use by soldiers.

Lithium ion batteries used in weapon platforms and vehicles as well as those carried by soldiers need to be regularly charged. Current lithium ion batteries, however, cannot be charged at temperatures below zero degrees C. due to permanent damage that they suffer due to so-called lithium plating. The only solution that has been available for charging lithium ion batteries at low temperature has been their direct heating in a thermally insulated chamber or similarly using heating blankets. Providing external and even internal heating elements, however, consumes a lot of power and takes a long time since heat must be conducted from outside the battery into the battery core (similar to the process of defrosting food). The process might be practical at stations where ample time and line or generated power is available. The process is however impractical for soldiers and their weaponry since it requires transportation of generators and fuel to the field. The current solution is at least logistically highly inefficient even for vehicles and motorized weapon platforms since it adds the amount of weight and of fuel that needs to be transported.

In addition to low temperature charging issues with lithium ion batteries, once charged, their performance rapidly deteriorates as the temperature drops during use. Thus, the only currently available method of keeping them operational at low temperatures is their continuous heating by heating blankets or the like to prevent their core temperature from falling significantly below zero degrees C., noting that lithium ion battery performance drops even at temperatures of −5 to −10 degrees C., becoming highly inefficient as approaching temperatures of −30 degrees C. and below.

Currently available liquid reserve batteries suffer from many shortcomings, including low energy density as compared to lithium ion batteries, relatively short running time following activation, and low temperature performance. In fact, at temperatures below around −20 to −30 degrees C., their performance is greatly degraded, which makes them incapable of providing the required power in many munitions applications. In addition, in some munitions applications in which munitions must stay powered for days and sometimes for a month or more, current liquid reserve batteries cannot be kept operational for the entire mission period. Thermal reserve batteries are obviously impractical for the latter applications due to their very short run time of at most several minutes. There is therefore a great need for reserve batteries that are high energy, can be activated and stay operational at very low temperatures and that can stay operational over periods of several weeks and possibly a month.

SUMMARY

The methods and power systems disclosed herein address both the safety and the above shortcomings of lithium ion batteries. An objective of such methods and power systems is to survive launch setback accelerations of up to 70,000 Gs for weapon platforms, military vehicles and other mobile and stationary platforms. The power systems must be safe, have a military shelf-life of 20 years and survive high flight vibrations of tens of thousands of cycles and storage temperatures from −55 degrees C. to 125 degrees C.

A new class of reserve batteries has been developed based on rechargeable Lithium-ion battery technology and clearly demonstrated. In these novel reserve batteries, the battery electrolyte was injected into the charged battery cell for activation—like the currently available liquid reserve batteries. The electrolyte was injected under pressure and preheated at low temperatures for fast activation at very low temperatures. At very low temperatures, the low temperature performance enhancement technology can rapidly bring the battery internal temperature up for full power delivery.

Thus, the reserve battery would have the required shelf-life of over 20 years when fabricated in stainless steel and hermetically sealed packaging as is common practice in current reserve battery manufacturing processes. In weapon platform applications, the battery can undergo thousands of cycles of recharging following activation as has been achieved by current Lithium-ion battery technology.

In the munitions applications, the separation of the electrolyte from the battery cell ensures safety in case of battery damage.

The fast charging rate and high energy power systems provides innovative solutions to lithium ion battery design and chemistry; provides technologies for fast charging of lithium ion batteries, particularly at low temperatures; addresses low temperature performance at very cold temperatures of up to −55 degrees C.; and provides innovative technologies for the development of lithium ion battery based reserve power sources for munitions applications, including their means of initiation and packaging to withstand setback accelerations of up to 70,000 Gs.

The LIB cells are structured on a pair of solid electrodes with a porous solid separator membrane between them. The porous separator is filled with a liquid electrolyte, which is lithium salts dissolved in aprotic organic solvents (alkyl carbonates). The role of separator is mainly to prevent an electrical short circuit between the two electrodes. The separator does not provide a sealing effect. That means the liquid electrolyte is present not only in the porous separator but also in any space inside the closed cells. This cell structure has the potential of a LIB to be designed as a liquid reserve battery.

In the present LIB based reserve battery power systems, the feasibility of which is clearly demonstrated via prototype fabrication of several batteries and their extensive testing, the cells are first assembled and provided with the liquid electrolyte. The batteries are then fully charged. The charged batteries are then disassembled, their separator membrane is discarded, and their electrolyte washed away. The cell is then dried and re-assembled with a new separator membrane. The re-assembled cell together with a separate liquid electrolyte reservoir form a fully charged LIB-based (rechargeable) reserve battery, hereinafter referred to as a "Lithium Ion Rechargeable Reserve Battery" (LIRRB). The liquid electrolyte is then released into the battery cell during the activation process.

In the "Lithium Ion Rechargeable Reserve Battery" (LIRRB), the stored liquid electrolyte is preheated and pressurized via provided pyrotechnic material for release into the battery cell to ensure proper operation at low temperatures as well as for fast initiation. Such reserve batteries are particularly suitable for applications in which high density power sources have to be provided to certain devices for periods that could extend to many days or even over a month. For such missions, the lithium ion based reserve batteries are superior to all available liquid reserve batteries due to their significantly higher power density and low self-discharge rates. The batteries can also provide enough power for low power electronics at very low military temperatures, while low temperature performance enhancement technology can rapidly bring their internal temperature up for full power delivery. The self-powered and very low energy programmable electrical initiation devices are also well suited for initiation of the present reserve batteries.

The baseline performance characteristics of the power systems include:

1. The lithium ion based rechargeable reserve batteries (LIRRB) provide high density power sources for munitions and other similar applications with a shelf-life of well over 20 years.

2. The novel liquid electrolyte packaging with pre-release heating and pressurization ensures that the lithium ion reserve batteries can be activated rapidly and perform well at the required low temperatures of down to −55 degrees C.

3. By constructing lithium ion batteries as reserve batteries with separate electrolyte compartments, the shelf life of the battery will be very long and is significantly longer than the required 20 years.

4. The method for activation of the lithium ion based reserve batteries by injecting heated electrolyte under pressure into the battery cell would allow their very fast activation even at very low temperatures.

5. The lithium ion based reserve batteries are highly safe against damage since their volatile electrolyte is separately stored from the battery core.

6. The energy density of a lithium ion battery is significantly higher than any current liquid reserve battery. Commercially available and charged lithium ion batteries can also operate for weeks and even months with minimal discharge rates. Thus, the reserve version of lithium ion batteries is expected to provide power for weeks and even months. The self-discharge enhancements will allow the operational life to be extended even further.

7. The lithium ion reserve batteries for munitions and platform and soldier batteries allow a relatively small current draw even at very low temperatures that can be used to keep low power electronics powered. The performance enhancement methods can then be used to rapidly increase the battery electrolyte temp above zero degree C. and provide maximum battery power when needed.

8. The lithium ion self-discharge methods will allow the operational life and the number of charge-discharge cycles of the reserve battery following activation to be significantly increased for weapon platform and other mobile platform applications.

9. The lithium ion based reserve batteries incorporate features to mitigate safety concerns of commercial LIB at different levels, including at cell, battery pack, battery management and control system and user environmental conditions to yield highly safe batteries for military applications.

10. The lithium ion based reserve battery power system for weapon platforms, military vehicles and other mobile and stationary platforms have a high level of safety against thermal overheating, mechanical damage such as crushing or puncturing and high levels of vibration, and electrical abuse, such as overcharging and external and internal shorts.

11. The lithium ion battery based reserve power system can include low temperature charging and low temperature operational performance enhancement methodology. This methodology would allow fast charging of lithium ion batteries at temperatures as low as −55 degrees C. and allows its effective operation at such temperatures.

12. The methodology for activation of the lithium ion based reserve batteries by injecting heated electrolyte under pressure into the battery cell will allow their very fast activation even at very low temperatures.

13. The lithium ion fast charging and operational enhancement methodology is also applicable to super-capacitors for temperatures well below their current limits of −40 to −45 degrees C. and will make their effective use possible at temperatures even below −55 degrees C.

BRIEF DESCRIPTION OF THE DRAWINGS

These and other features, aspects, and advantages of the apparatus of the present invention will become better understood with regard to the following description, appended claims, and accompanying drawings where:

FIG. 11 illustrates a graph showing first discharge/charge curves of the LFP half-cell.

FIG. 12 illustrates a graph showing first discharge/charge curves of the LTO half-cell.

FIG. 13 illustrates a graph showing first discharge/charge curves of the LFP/LTO full cell.

FIG. 14 illustrates graphs showing charge curve of the LFP half cell (left) and discharge curve of the reassembled LFP half cell.

DETAILED DESCRIPTION

Figure 1:
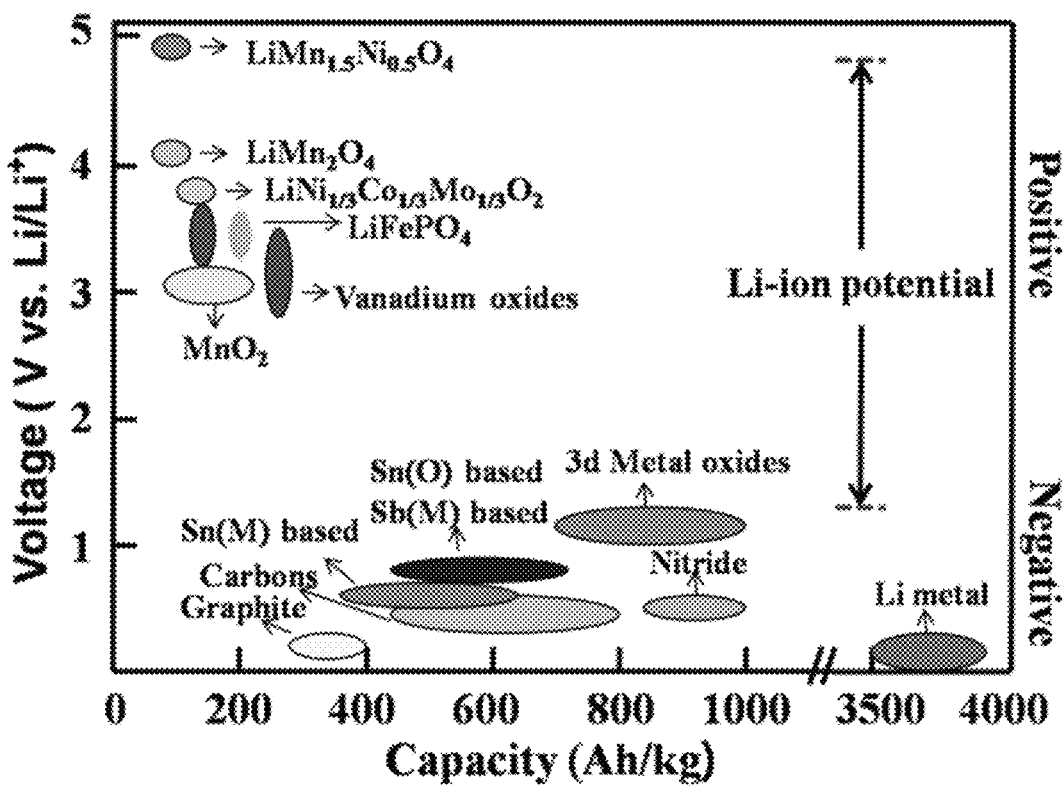
FIG. 1 illustrates a graph showing voltage versus capacity for cathode and anode materials presently used or under serious considerations for Li-ion batteries.

The LIB cells are structured on a pair of solid electrodes with a porous solid separator membrane between them. The porous separator, most commonly made of polyethylene and polypropylene, is filled with a liquid electrolyte, which is lithium salts dissolved in aprotic organic solvents (alkyl carbonates). The role of the separator is mainly to prevent an electrical short circuit between the two electrodes. The separator does not provide a sealing effect. This means that the liquid electrolyte is present not only in the porous separator but also in any space inside the closed cells. The reserve battery power system disclosed herein is based on using this cell structure to develop LIB based reserve batteries.

The process for the fabrication of the LIB based reserve batteries includes assembly of the LIB. The batteries are then fully charged. The charged batteries are then disassembled, their separator membrane is discarded, and their electrolyte washed away. The cell is then dried and re-assembled with a new separator membrane. The re-assembled cell together with a separate liquid electrolyte reservoir form a fully charged "Lithium Ion Rechargeable Reserve Battery" (LIRRB). The liquid electrolyte is then released into the battery cell during the activation process. In addition, provided methodology allows injection of the heated electrolyte into the battery cell for its fast activation and for charging the battery and keeping it at its optimal operating temperature at temperatures as low as −55 degrees C.

The LIRRB can then be used in munitions, in which case its rechargeability may or may not be used. The reserve nature of the LIRRB gives it a shelf life that could be well over 20 years. In military platform applications, such as weapon platforms, vehicles and unmanned mobile platforms as well as for use by soldiers, the LIRRB can be activated at the required time and be recharged as needed for thousands of cycles. Provided methodology allows fast charging and the battery can be kept at its optimal operating temperature at temperatures as low as −55 degrees C.

Provided herein are high energy reserve type lithium ion battery (LIB) based reserve power source for gun-fired projectiles that can survive launch setback accelerations of up to 70,000 Gs and can be capable of providing power for weeks at very low temperatures as required for military operations. The "Lithium Ion Rechargeable Reserve Battery" (LIRRB) can be readily packaged using currently available liquid reserve battery technology to survive the indicated launch setback environment and high flight vibration of thousands of cycles. The fully deactivated battery cells with separately stored electrolyte allows the batteries to be stored at temperatures from −55 degrees C. to 125 degrees C. without any damage and/or degradation. The reserve nature of fully deactivated battery cells ensures a shelf-life of over 20 years, and that can survive high flight vibrations in excess of tens of thousands of cycles.

The "Lithium Ion Rechargeable Reserve Battery" (LIRRB) also allows the development of highly safe and rechargeable power sources for weapon platforms, military vehicles and other mobile and stationary platforms with shelf-life of over 20 years that can be rapidly activated and go through thousands of charge-discharge cycles.

The LIRRB fast charging and performance enhancement methodology allows the developed platform and soldier batteries to be charged rapidly at temperatures that are even lower than the required −55 degrees C. The latter capability also allows the performance of the LIRRB power sources at very low temperatures to be increased to the room temperature levels.

The high energy density reserve battery based on Li-ion battery (LIB) technology was successfully demonstrated with the selected highly stable LiFePO$_4$/Li$_4$Ti$_5$O$_{12}$ (LFP/LTO) Li-ion battery chemistry. The process of selecting this chemistry and its suitability for reserve munitions and weapon platform applications; and prototyping several battery cells for proof-of-concept and initial performance and shelf-life studies are described below.

Lithium-ion battery (LIB) technology has unique advantages—increased capacity (~5×) and decreased weight (~⅓) in comparison to the liquid reserve and thermal batteries currently used in reserve batteries. FIG. 1 compares several representative cathode and anode materials presently used or under serious considerations for the next generation of rechargeable Li-based cells. Clearly maximizing energy density of either positive or negative electrode materials will improve these technologies. The capacities of the cathode materials currently used or under serious considerations, including LiCoO$_2$ (LCO), Li$_2$MnO$_4$ (LMO), LiNi$_{0.8}$Co$_{0.15}$Al$_{0.05}$O$_2$ (NCA), LiNi$_{1/3}$Co$_{1/3}$Mn$_{1/3}$O$_2$ (NCM), LiFePO$_4$ (LFP), LiMnPO$_4$ (LMP), and LiMn$_{1.5}$Ni$_{0.5}$O$_4$ (LMNO), are in the range of 120 to 220 mAh/g. At the anode side, graphitic carbon has been used for many years since its desirable properties such as large reversible lithium (Li$^+$P) intercalation, good electrical conductivity, and stable solid electrolyte interface (SEI). However, there are several drawbacks associated with the use of graphitic carbon including its relatively low specific capacity (372 mAh/g), poor rate capability in high-current applications, increasing internal resistance with cycling and age, as well as safety concerns due to thermal runaway conditions because of thermal exposure, overcharge and overheat conditions. Also, the dendrites formed and grown during cycling, penetrate the porous separator causing an internal electrical short of the cells leading to battery fire accidents.

To meet the battery safety issues, stable anode materials were explored for military applications. Titanium-based oxides have been identified as one of the most promising materials for highly safe and high-power Li-ion rechargeable batteries (LIBs), as it is found in relatively high abundance in nature, exhibits very low toxicity, high structural and chemical stability, and has suitable operating voltages (1~2.0 V vs. Li) which could avoid the formation of an anode solid-electrolyte interphase (SEI) layer. For example, Li$_4$Ti$_5$O$_{12}$ (LTO), shows the expected excellent cycle life and rate capability.

Table 1 shows the characteristics of current commercial or potential Li-ion batteries. It can be seen that NCA/graphite battery shows the highest specific energy density but the poorest cycle performance and thermal runway. LFP/LTO battery shows the lowest specific energy but the highest power density and the safest.

TABLE 1

Characteristics of current Li-ion batteries.

| Battery Chemistry | iCO/Graphite | NMC/Graphite | NCA/Graphite | NMC/LTO | LFP/LTO |
|---|---|---|---|---|---|
| Voltage (V) | 3.0~4.2 | 3.0~4.2 | 3.0~4.2 | 1.8~2.85 | 1.2~2.2 |
| Specific energy (Wh/kg) | 150~200 | 150~220 | 200~260 | 70~80 | 50~70 |
| Charge rate (C) | 0.7~1 | 0.7~1 | 0.7 | 1~5 | 5~20 |
| Discharge (C-rate) | 1.0 | 1~2 | 1 | 10~30 | 10~30 |
| Cycle life | 500~1,000 | 1,000~2,000 | 500 | 3,000~7,000 | 20,000 |
| Thermal runway (P$^0$PC) | 150 | 210 | 150 | Safe | Highly safe |
| Applications | electronics | E-bikes, EV, medical devices | industrial | UPS, PHEV | Tools, electric powertrain |
| Comments | High specific energy/limited specific power | High specific energy/mediate specific power | High specific energy/limited specific power | High specific power/long life | Low specific energy/High specific power/long life |

Figure 2:
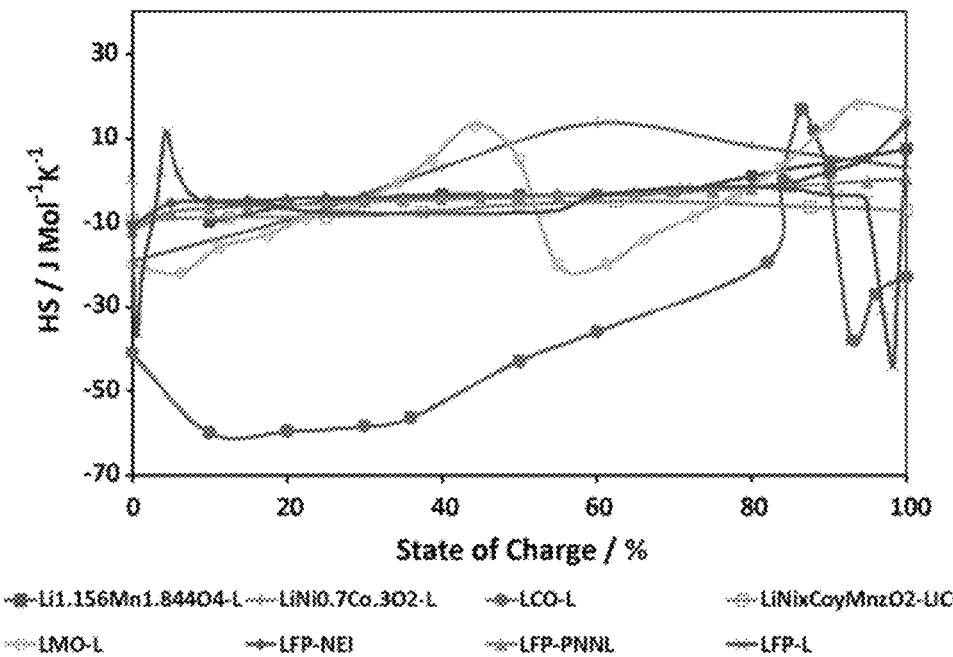
FIG. 2 illustrates a graph showing a comparison of entropy change ΔS for various cathodes.
Figure 3:
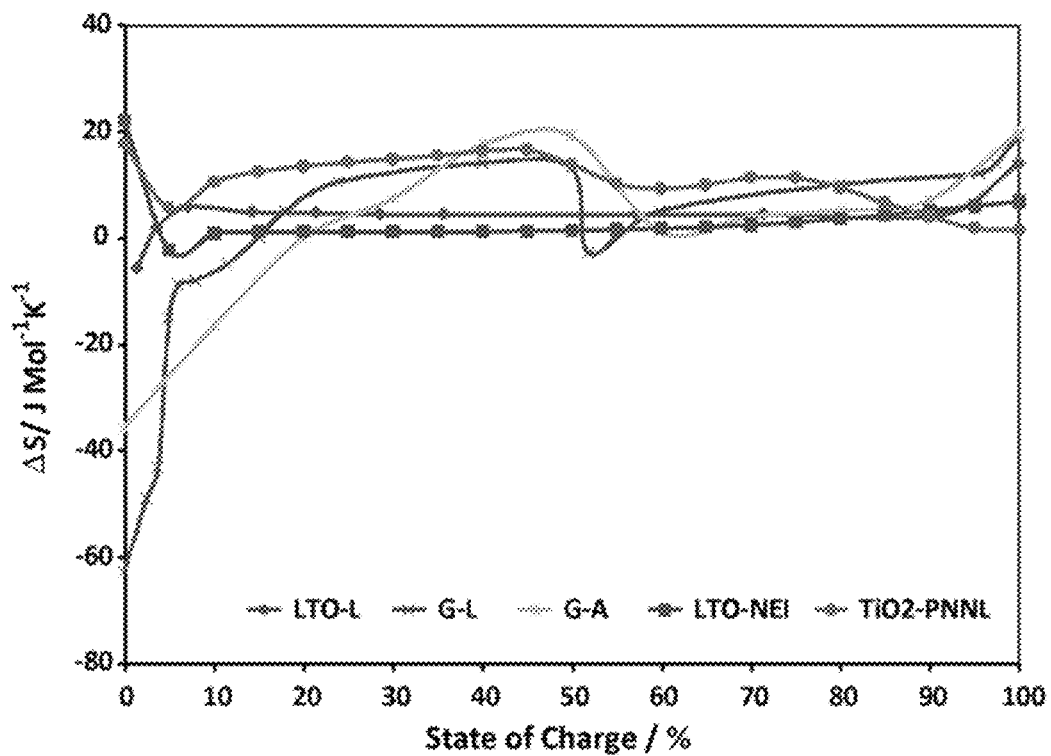
FIG. 3 illustrates a graph showing a comparison of entropy change ΔS for various anodes.

The entropy change $\Delta S$ can contribute more than 50% of the total heat generated (in Joules) at high discharge rate. While it is certainly useful to determine the total reversible heat generated during charge or discharge, in certain state of charge (SOC) ranges, the rate of reversible heat generation can be extremely high. Hence it is also important to quantify the rate of reversible heat generation at various SOCs and determine its fraction of total rate of heat generation at each SOC. This can serve as a tool for the battery management system to control battery load or charge current at various SOCs such that high temperature excursions are effectively prevented. While the internal resistance (and hence the irreversible heat generation rate) can be minimized by suitable electrode and cell design, the reversible heat generation rate can play a significant role especially in cases when internal resistance has been minimized. The entropy changes in various cathode and anode materials, as well as in complete Li-ion batteries, were measured using an electrochemical thermodynamic measurement system (ETMS). FIG. 2 shows the $\Delta S$ entropy for all cathodes, while FIG. 3 shows $\Delta S$ for all anodes. The $\Delta S$ values for LiCoO$_2$ was significantly higher than other cathodes, while modification with Ni and Mn resulted in much lower $\Delta S$ for LiNi$_x$Co$_y$Mn$_z$O$_2$. However, LiCoO$_2$ modification without Mn presence showed higher $\Delta S$ values as seen for LiNi$_{0.7}$Co$_{0.3}$O$_2$. LiMn$_2$O$_4$ and its modification such as $LiR_{1.156}RMnR_{1.844}ROR_4R$ have low ΔS, while $LiFePOR_4R$ procured from NEI Corp. and synthesized at PNNL, along with the literature reported value (LFP-L), have extremely low ΔS values across 0-95% SOC. Among anodes, graphite has higher ΔS values, while the $LiR_4RTiR_5ROR_{12}R$ lithium titanates (LTOs) as reported in the literature and the LTO procured from NEI Corp. had very low ΔS.

Figure 4:
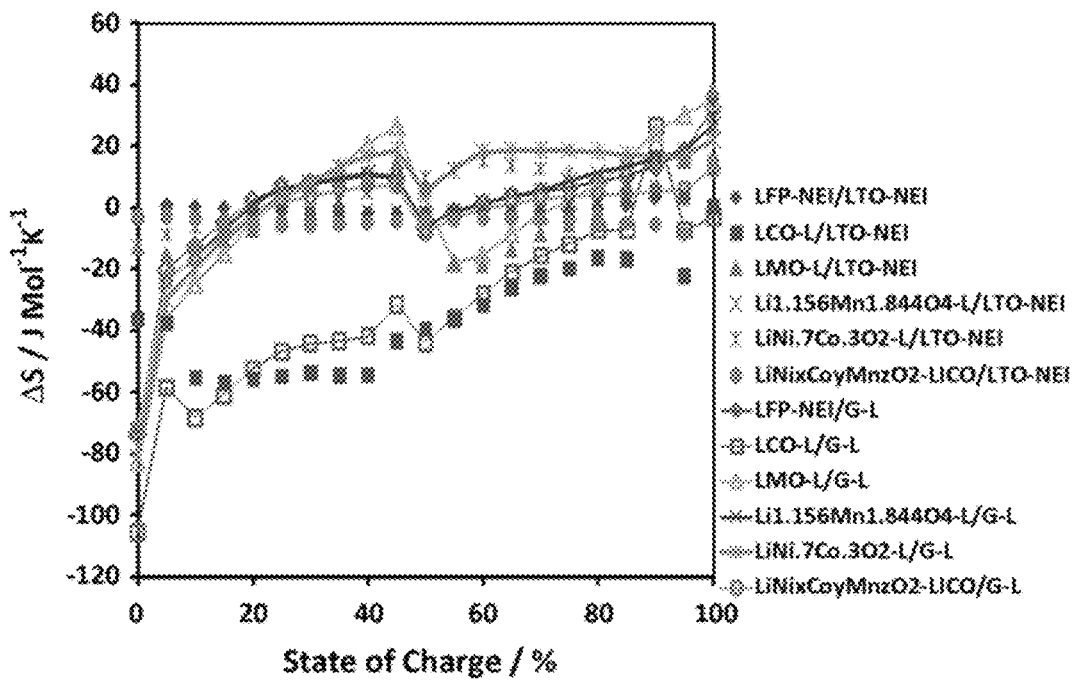
FIG. 4 illustrates a graph showing a computed full cell ΔS from individual electrode ΔS.

Full cell entropies calculated for various electrode combinations are shown in FIG. 4. As expected, $LiCoOR_2R$ based cells have a high change in entropy, while full cell ΔS values were low in magnitude for all the combinations. Clearly the LFP-LTO combination corresponds to the lowest reversible heat generation rate contribution, LTO based cells correspond to lower reversible heat generation rates compared to graphite based cells. It can be concluded that the LFP/LTO electrode couple is the safest LIB electrode among these electrode couples used in current Li-ion batteries based on the entropy calculation.

Figure 5:
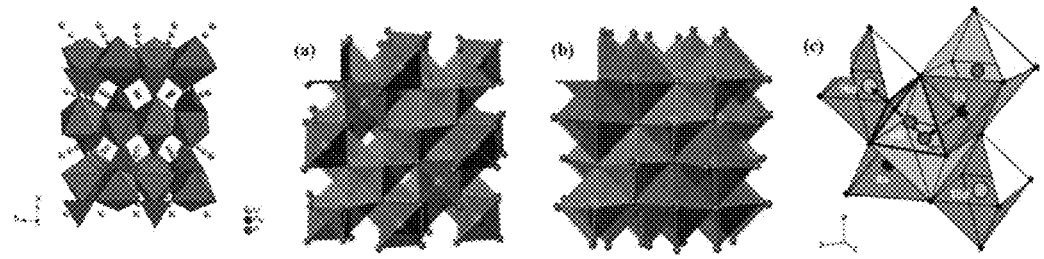
FIG. 5 illustrates crystal structure of LiFePO4 (left) and Li4Ti5O12 (right).

Crystal structures of LFP and LTO are olivine and spinel structures as shown in FIG. 5, respectively. Each spinel unit cell consists of eight molecules of $ABR_2ROR_4R$; 32 oxygen anions form a close-packed cubic oxygen anion lattice with 32 large octahedral and 64 small tetrahedral sites. In a normal spinel structure, B cations occupy half of the octahedral sites, whereas A cations occupy one-eighth of the tetrahedral sites. The olivine structure consists of vertex-sharing $MOR_6R$ octahedrons, as well as $POR_4R$ tetrahedrons that share one edge and all vertices with $MOR_6R$ octahedrons. In $LiFePOR_4R$, oxygen anions form a close-packed array, with half of the octahedral sites being occupied by lithium or iron ions and one-eighth of the tetrahedral sites by phosphorus ions. In both spinel and olivine crystals, oxygen anions form a robust framework of a closely packed anion sublattice with a densely packed atomic arrangement in three dimensions (3D), whereas layer-structured crystals consist of relatively loose stacks perpendicular to the two-dimensional planes. When subjected to the insertion or extraction of lithium ions, the robust 3D frameworks of spinel or olivine crystal electrodes show negligible structural distortion, retaining the same site energy and displaying an almost constant electrochemical potential and fast Li-ion transportation. These crystal structures are beneficial to high rate performance.

Figure 6:
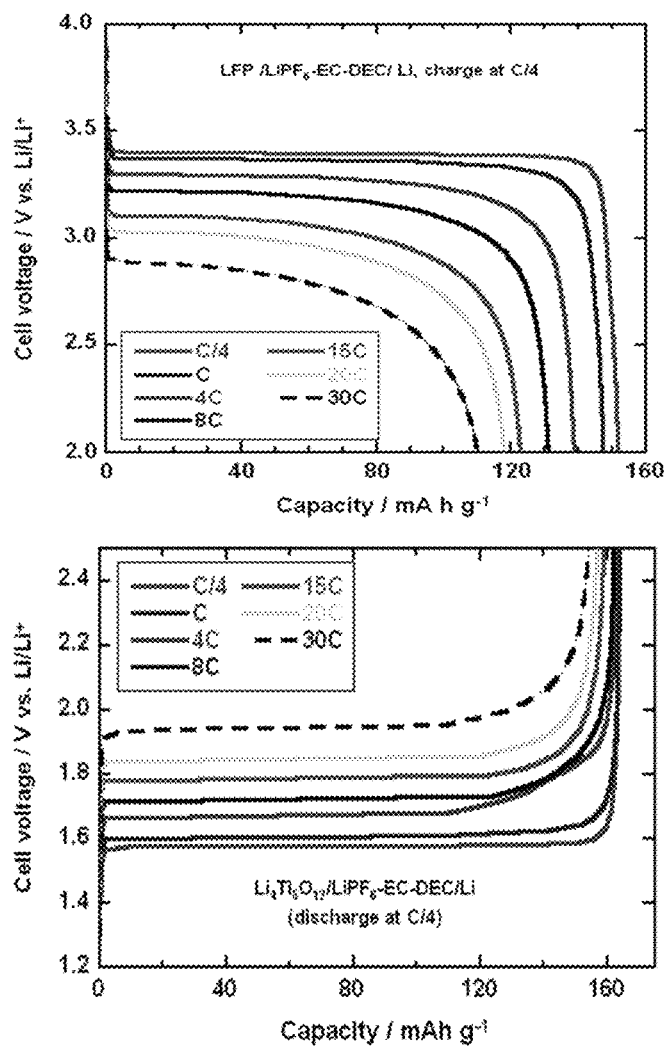
FIG. 6 illustrates graphs of discharge and charge curves of the LFP cathode (left) and LTO anode (right) at different C-rate.
Figure 7:
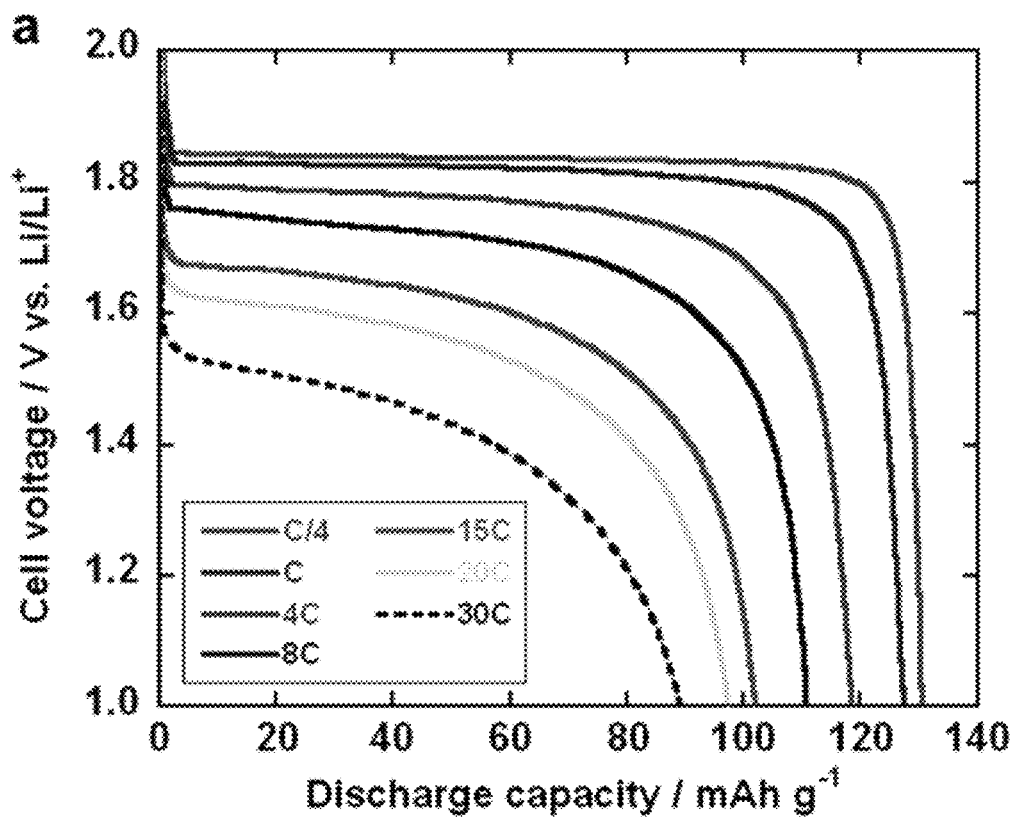
FIG. 7 illustrates a graph showing discharge curves of the LFP/LTO full cell at different C-rate.

Both LFP and LTO electrodes have been confirmed to be high power electrode materials as shown in FIG. 6. The combination of LFP/LTO also shows a very high C-rate performance. It still can be discharged at a C-rate of 30 C as shown in FIG. 7.

Figure 8:
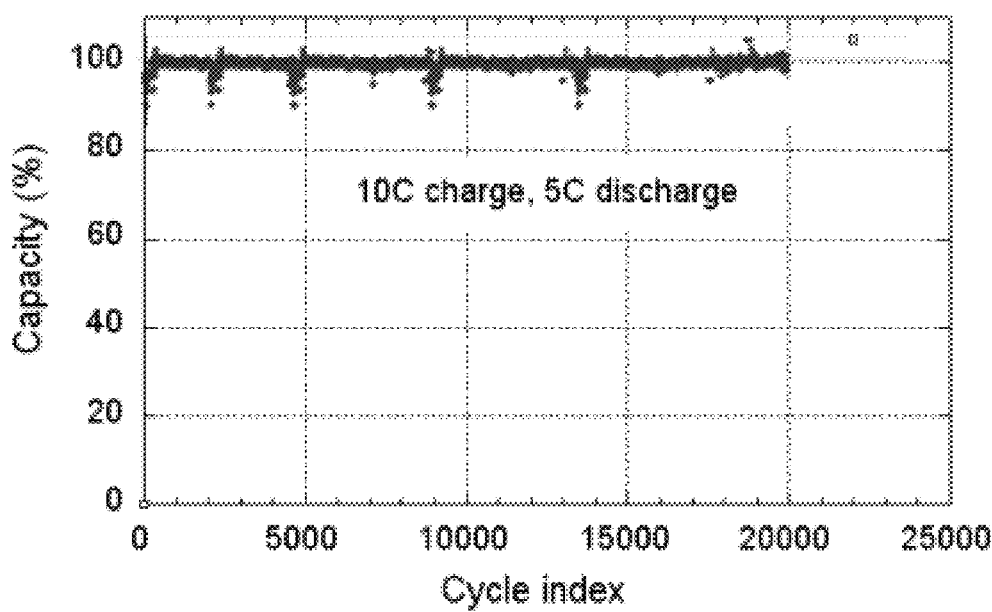
FIG. 8 illustrates a graph showing cycling performance of the LFP/LTO cell.

The cell cycling life of the LFP/LTO cell has been investigated widely. The best cycling performance is shown in FIG. 8. As can be seen, the LFP/LTO cell showed almost 100% capacity retention after 20,000 cycles at high C-rate.

Figure 9:
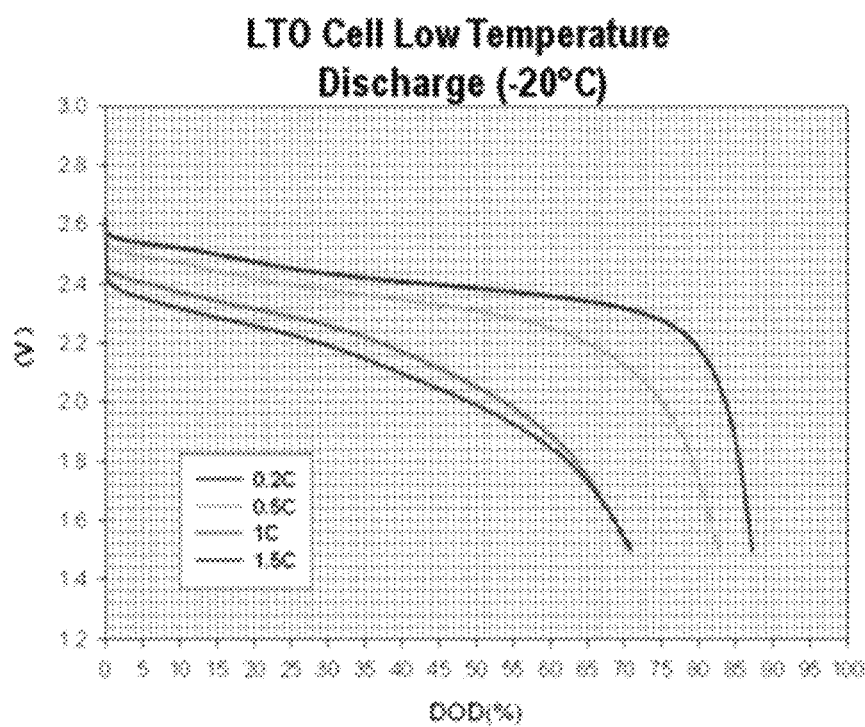
FIG. 9 illustrates a graph showing discharge curves of the LTO cell at low temperature.

The low temperature (at −20P° PC) of the LFP/LTO cell has been reported. It can operate as low as −20P° PC and shows over 70% capacity as shown in FIG. 9.

From the above Lithium-ion battery chemistry and characteristics review, it is concluded that the LFP/LTO is a good candidate for reserve battery development due to its super rate performance, excellent cycling performance and high safety. Like all other Lithium-ion battery chemistries, the LFP/LTO battery chemistry also has low temperature performance issues and cannot be charged at temperatures below zero degrees C. This shortcoming of such batteries will be addressed using developed methodology, which is discussed below together with related test results.

Reserve batteries can be activated by adding electrolyte into the battery cell, by introducing a gas into the cell that is either the active cathode material or part of the electrolyte, or by heating a solid electrolyte to a temperature at which it becomes conductive. The "missing element" of the battery can be added before use in several ways. The battery can have water or electrolyte added manually, the battery can be activated when the system is dropped into water (such as in a sonobuoy), or electrolyte can be stored in a capsule within the battery and released by mechanical means, an electrical trigger, or by spin or shock, as are currently done in various liquid reserve batteries used in munitions and other similar applications. In thermal batteries, a solid electrolyte is melted by igniting a pyrotechnic heat source. The battery delivers current for a short time (seconds to a few minutes). Reserve batteries can be configured for a shelf-life that can span several decades without deterioration. Current reserve batteries remain uncommon in civilian applications because of their higher cost and relatively short life (run time) after activation.

The Li-ion reserve battery is based on the LFP/LTO Li-ion battery chemistry and technology. From the Lithium-ion battery chemistry and characteristics review presented above, it was concluded that the LFP/LTO is a good candidate for reserve battery development due to its super rate performance, excellent cycling performance and high safety. The LFP/LTO Li-ion battery technology is highly developed and should therefore also lead to the fabrication of lower cost reserve batteries.

Figure 10:
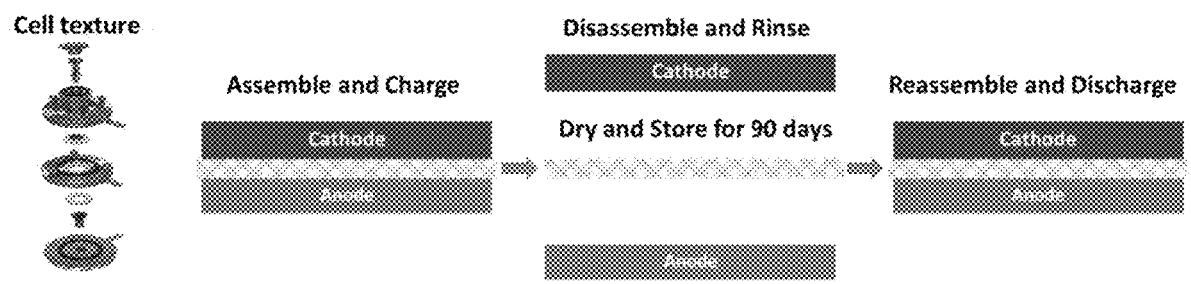
FIG. 10 illustrates a fabrication process of the LFP/LTO reserve battery cell.

The fabrication process of the proposed Li-ion based reserve batteries is as follows and as shown in FIG. 10:
1. Assemble LFP/LTO full cell;
2. Charge the LFP/LTO cell;
3. Disassemble the cell;
4. Rinse and dry the electrode and discard the separator membrane
5. Reassemble LFP and LTO electrodes and the separator membrane (without the electrolyte);
6. Activate by adding the electrolyte at the desired time.

The LFP/LTO reserve battery cell is then packaged together with the electrolyte reservoir using a methodology that allows its heating and injection into the battery cell under pressure to achieve fast activation, even at very low temperatures. The latter technology and reserve battery packaging concept is described below.

Active materials, Super C 65, and PVDF binder were mixed with a ratio of 7:1.5:1.5 and dispersed in NMP to form slurries. Then the LTO and LFP slurries were casted on Al foil and Cu foil, respectively. The electrodes were dried and punched into disc electrode with a diameter of 13 mm. The LTO and LFP half cells were assembled using Celgard 2400, $LiPFR_6R$ in EC/DEC electrolyte and Li metal foil in CR2032 coin cell. The cells were tested using Arbin battery tester.

As seen from FIG. 11 and FIG. 12, both LTO and LFP electrodes exhibit a reversible capacity of ~150 mAh/g. The charge plateau of LTO is ~1.6V and the discharge plateau o LFP is ~3.43V, which indicates that the discharge plateau of the full cell will be ~1.83V. The initial coulombic efficiency of the LFP half-cell is ~80% and that of the LTO half-cell is 91%.

After finishing the characterization of the electrode materials in half cell, the LFP/LTO full cell was fabricated and tested. The LFP and LTO electrodes with similar loading have been assembled in coin cell. The first charge/discharge curves are shown in FIG. 13. It can be seen the cell shows a discharge plateau of ~1.84 V and a charge plateau of 1.86V. The discharge capacity is around 137 mAh/g based on cathode mass.

The LFP electrode was firstly tested as a reserve battery electrode in half-cell. It was reassembled with Lithium foil after drying and storing for one day. The open-circuit voltage of the half-cell is 3.43 V and the cell delivered around 150 mAh/g discharge capacity as shown in FIG. 14, which means that almost no capacity loss after the charged LFP electrode is shelved for 1 day.

Figure 15:
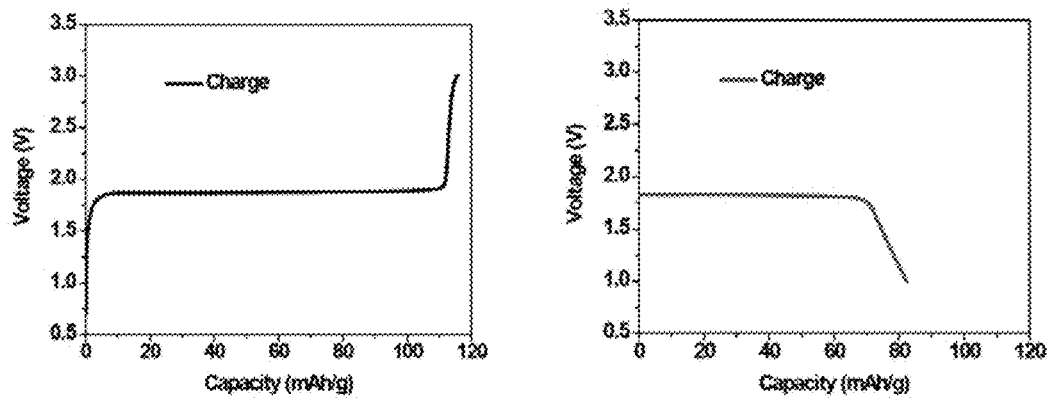
FIG. 15 illustrates graphs showing charge curve of the LFP/LTO full cell (left) and discharge curve of the reassembled LFP/LTO full cell.

The LFP/LTO full cell was fabricated and tested as a reserve battery. Firstly, the cell was charged to 3.0 V, then the cell was disassembled and the electrodes were rinsed and dried. It was reassembled after being shelved for 2 days and electrolyte was added to the battery cell. The open-circuit voltage of the cell was 1.83 V and the cell delivered around 85 mAh/g discharge capacity as shown in FIG. 15, which means that reasonable capacity was obtained with a coulombic efficiency of 75% probably due to the external short circuit or the mismatch loading of the positive and negative electrodes, which can be eliminated through a more careful fabrication process and use of equipment in a controlled environment.

Figure 16:
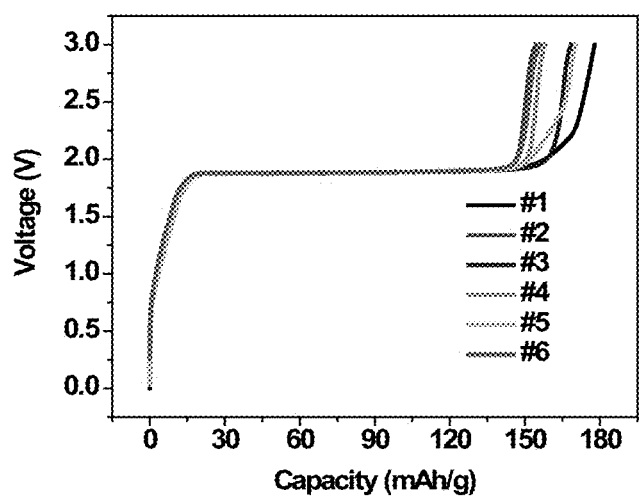
FIG. 16 illustrates a graph showing charge curves of the LFP/LTO full cells.

Six LFP/LTO full cells were fabricated at the same time. They were charged to 3.0 V as shown in FIG. 16. After that, the cells were disassembled and the electrodes were rinsed and dried in glovebox. The cells were reassembled and were activated in a period of 92 days as described below. From FIG. 16 it can be seen that the charge capacity of all cells are around 150 mAh/g.

Figure 17:
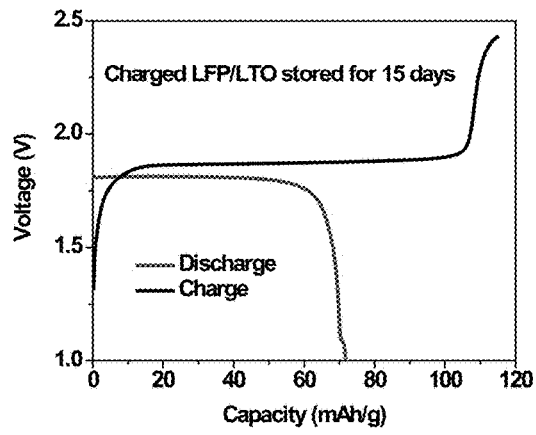
FIG. 17 illustrates a graph showing the charge and discharge curves of the LFP/LTO reserve cell after being shelved for 37 days.

One charged LFP/LTO cell was activated after 15 days. The performance of the reassembled cell was tested and its discharge curve is shown in FIG. 17. As can be observed, the discharge capacity was around 75 mAh/g, which is slightly lower than that of a cell that is activated after one day of storage. The cell, however, was charged back to 120 mAh/g, which indicates that the capacity loss is not from electrode material degradation. This capacity loss is most probably due to the process and equipment, which can be eliminated or at least made relatively negligible through process and equipment optimization.

Figure 18:
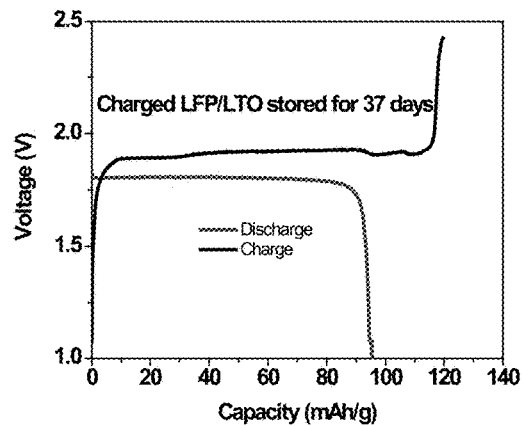
FIG. 18 illustrates a graph showing the charge and discharge curves of the LFP/LTO reserve cell after being shelved for 15 days.

The next charged LFP/LTO cell was activated after 37 days. The performance of the reassembled cell was tested and its discharge curve is shown in FIG. 18. It can be seen that the discharge capacity was around 95 mAh/g, which is much higher than that of the cell that was shelved for 15 days. These results confirm that any capacity loss is not from electrode material degradation.

Figure 19:
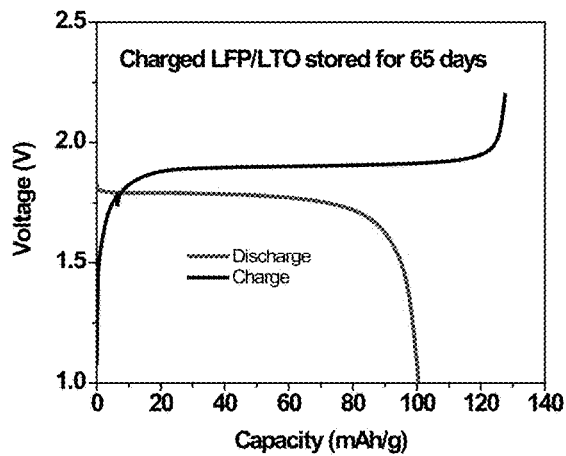
FIG. 19 illustrates a graph showing the charge and discharge curves of the LFP/LTO reserve cell after being shelved for 65 days.
Figure 20:
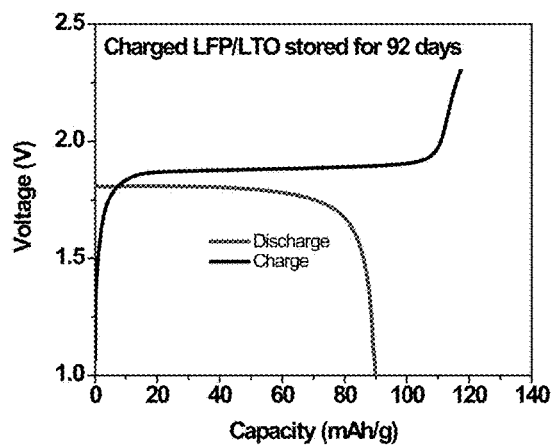
FIG. 20 illustrates a graph showing the charge and discharge curves of the LFP/LTO reserve cell after being shelved for 92 days.

The next two charged LFP/LTO cells were activated after 65 and 92 days. The performance of the reassembled cells were tested and their discharge curves are shown in FIGS. 19 and 20, respectively. It can be seen the discharge capacities are around 100 and 89 mAh/g, respectively. The cells exhibit a capacity retention of ~76%.

The capacity retentions of the LFP/LTO reserve batteries after the above storage times are summarized in Table 2. As can be seen, capacity retention of the batteries after the indicated days of storage is expected to be in the range of 75~80%. The capacity retention can be significantly improved by well-known techniques such as by optimizing the cell texture (using insulating PTFE split cell) and by improving the fabrication process.

TABLE 2

Summary of capacity retention of the LFP/LTO reserve batteries following storage.

| Shelfing time (days) | Capacity (mAh/g) | Capacity retention (%) |
| --- | --- | --- |
| 15 | 72 | 62.8 |
| 37 | 95 | 79 |
| 65 | 101 | 78.7 |
| 92 | 90 | 75.8 |

Figure 21:
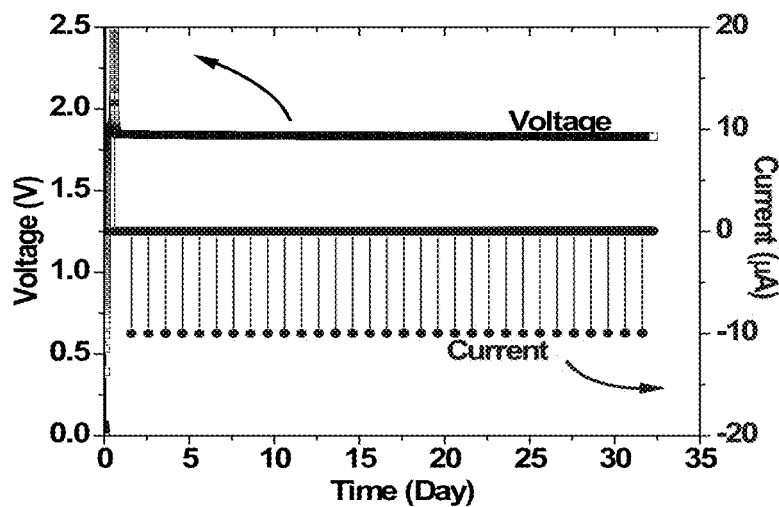
FIG. 21 illustrates a graph showing the operation life of the Li-ion reserve battery.

The Li-ion reserve battery was tested after being activated for over 30 days. The testing consisted of drawing small current pulses (10 µA for 10 seconds) each day. As can be seen in FIG. 21, the tested cell can be expected to last well over the 30 day testing period and after 30 days it still shows a very stable output voltage.

Figure 22:
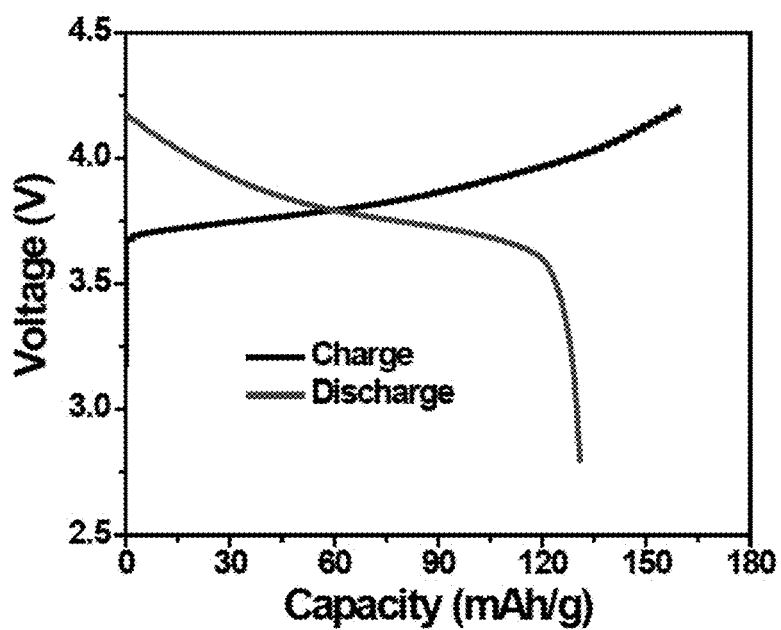
FIG. 22 illustrate a graph showing discharge/charge curves of the NMC half cell.

As listed in Table 1, the specific energy of the LFP/LTO cells are relatively low compared to NCM/LTO cells. It is interesting to determine the performance of higher energy density NMC/LTO chemistry if used as the basis for the present reserve batteries. A NMC cathode was fabricated and tested in half cell. The discharge voltage of the NMC cathode is higher than a LFP cathode which may provide higher specific energy, as shown in FIG. 22, showing feasibility of achieving even higher energy density with NMC/LTO based reserve batteries.

Based on the above results:

1. A LFP/LTO electrode couple has been selected for the Li-ion reserve battery based on its excellent rate performance, cycling life, and safety.

2. The LFP/LTO Li-ion reserve batteries have been electrochemically tested and the cell exhibited higher than 78% capacity retention after being shelved for 92 days, as fabricated without an optimized manufacturing process and equipment.

3. After activation, the tested reserve LFP/LTO batteries showed a cell life that can expand well over the 32 days testing period while a pulse discharge current is applied each day.

Higher energy density electrodes NMC has also been fabricated and tested in a half cell.

In the LIB based reserve batteries, pyrotechnic charges can be used to heat and inject the liquid electrolyte into the battery cell under pressure to ensure fast activation and high performance at temperatures that may be as low as −65 degrees C.

Figure 23:
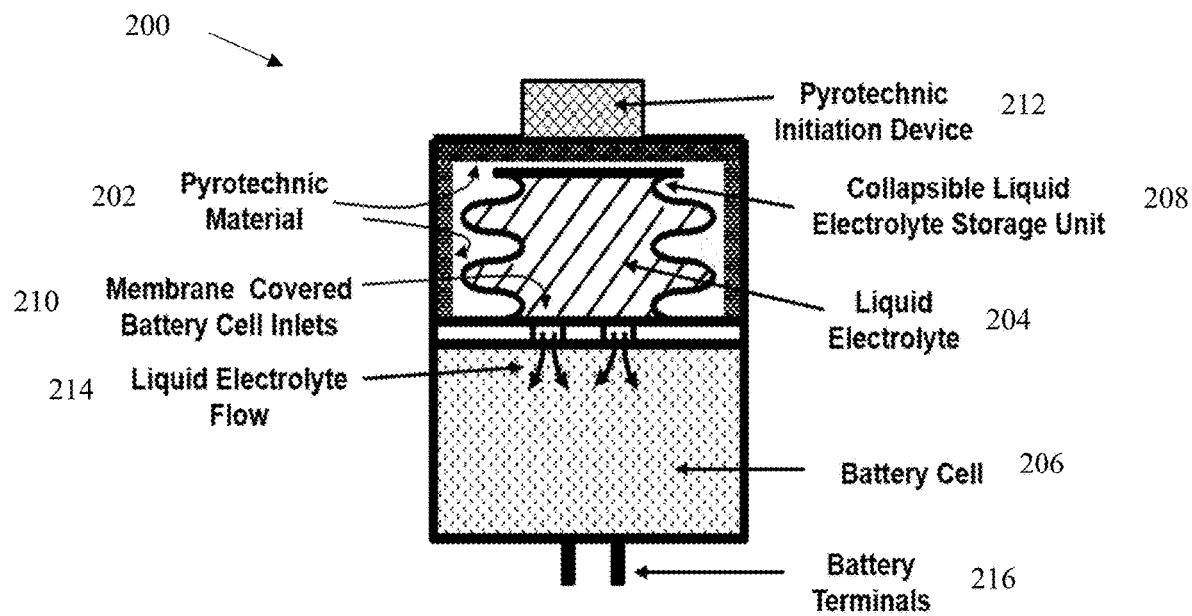
FIG. 23 illustrates a schematic of a pyrotechnic activated reserve battery for fast activation and high low-temperature performance.

The pyrotechnic charge activated liquid reserve battery 200 is shown in the schematic drawing of FIG. 23. The pyrotechnic charge 202 serves the following purposes. Firstly, it is used for battery activation, i.e., to release the stored liquid battery electrolyte 204 into the battery cell 206. Secondly, it generates heat, which is used to heat the electrolyte 204 to allow the battery 200 to be activated and function at very low temperatures and at the same time enhance its penetration rate into the battery cell 206 as well as its rate of diffusion. Thirdly, the pressure generated by the initiation of the pyrotechnic material 202 is used to inject the electrolyte 204 into the battery cell 206 under pressure.

The LIB based reserve battery 200 shown schematically in FIG. 23 is constructed with two separate compartments, a battery cell compartment and an electrolyte storage and injection mechanism compartment. The battery housing may have a circular or rectangular or other appropriately shaped cross-section. The liquid electrolyte 204 is stored in a collapsible (bellow like) metal storage unit 208. Outlets holes 210 are provided on the layer (plate) separating the electrolyte storage unit from the battery cell and are sealed by relatively thin diaphragms (such as metallic). Pyrotechnic materials 202, such as being configured in a layer as shown in the schematic of FIG. 23, are provided in the sealed volume between the collapsible liquid electrolyte storage unit 208 and the compartment walls. The battery 200 is provided with either an inertial initiator for gun-fired applications or an electrical initiation element for igniting the pyrotechnic material, referred to generally as an initiation device 212. The electrical initiation device 212 can be programmable electrical initiators. An advantage of such electrical initiator is its small size and that it could be packaged inside the electrolyte compartment, thereby significantly reducing the power source size.

The LIB based reserve battery of FIG. 23 is activated by igniting the pyrotechnic material 202 with the indicated (inertial or electrical) initiation device 212. The burning pyrotechnic material 212 will generate heat, which is used to heat the stored electrolyte 204, and generate pressure within the sealed volume between the collapsible liquid electrolyte storage unit 208 and the compartment walls. The generated pressure would then act over the surface of the collapsible liquid electrolyte storage unit 208, forcing it to collapse, thereby forcing the heated and pressurized liquid electrolyte to rupture the diaphragm, separating it from the battery cell and rapidly injecting the heated liquid electrolyte into the battery cell (at 214) thereby activating the battery 200 and producing power at the terminals 216.

The collapsible liquid electrolyte storage unit 208 can be configured with a relatively large surface area to allow for rapid transfer of heat to the liquid electrolyte 204. The storage unit 208 can also be configured to deform plastically under the generated pressure so that once the pressure has subsided, a minimal amount of the liquid electrolyte 204 is returned back to the storage unit 208. Alternatively, particularly when the size of the battery allows, one-way valves may be used to prevent the liquid electrolyte's 204 return to the storage unit 208.

As previously indicated, since in the LIB based reserve battery's electrolyte is stored in a separate compartment from the battery core, there is minimal safety issue before the battery is activated. For this reason, the safety issue is of more concern in platform applications.

A high-rate LIB for military use with maximum safety may exclude the use of lithium metal as the anode for its too high reactivity and its low melting point (180° C.) that poses an additional risk of fire hazard from molten lithium in case of overheating. A fast charge on pure lithium also results in the formation of dendrites growing on repeated cycling that will lead to short-circuiting the cell. Some recently developed anodes such as silicon or aluminum may not be used, even in their nanosized forms, because they experience huge volume expansion/contraction upon lithiation and delithiation. Therefore, graphite and $LiR_4RTiR_5ROR_{12}R$ (LTO) anodes may be used for military applications. For the cathodes, lithium manganese oxide ($LiMnR_2ROR_4R$) and lithium iron phosphate ($LiFePOR_4R$) may be used for military applications.

The other elements playing an important role in safety aspects (i.e. electrolyte, solvent, and separator) are selected to compromise high rate, safety, and low-temperature performance. A list of typical electrolyte materials (lithium salts) is shown in Table 3. The most common electrolyte at present is $LiPFR_6R$ which balances high-rate and safety. $LiBFR_4R$, though it is known to be safer under some conditions, its lower ionic conductivity and higher reactivity with graphite may not be best for high-rate battery cells. As for solvents, alkyl carbonates listed in Table 4 have been used most commonly to dissolve these lithium salts. Other organic solvents such as methyl formate provide higher ionic conductivity, but may provide high charge transfer resistance and thus slow intercalation, especially with graphite.

TABLE 3

Electrolytes for LIB.

| Electrolyte (lithium salt) | Melting point | Ionic conductivity at 25° C. | Comment |
|---|---|---|---|
| Lithium hexafluoro-phosphate ($LiPFR_6R$) | 200° C. | $5.8\sim10.7 \times 10P^{-3}P$ S/cm | Most commonly used |
| Lithium tetrafluoro-borate ($LiBFR_4R$) | 293° C. | $3.4\sim4.9 \times 10P^{-3}P$ S/cm | Can be safer than $LiPFR_6R$ under some conditions |
| Lithium perchlorate ($LiClOR_4R$) | 236° C. | $5.6\sim8.4 \times 10P^{-3}P$ S/cm | Used in earlier LIB |
| Lithium hexafluoro-arsenate ($LiAsFR_6R$) | 340° C. | $5.7\sim11.1 \times 10P^{-3}P$ S/cm | Contains highly toxic arsenic |

TABLE 4

Solvents for LIB.

| | | | Ionic conductivity of 1M $LiPFR_6$ | |
|---|---|---|---|---|
| Solvent | MP | BP | at −40° C. | at 20° C. |
| EC (ethylene carbonate) | 39° C. | 248° C. | — | $6.9 \times 10P^{-3}P$ S/cm |
| PC (propylene carbonate) | −48° C. | 242° C. | $0.2 \times 10P^{-3}P$ S/cm | $5.2 \times 10P^{-3}P$ S/cm |
| DMC (dimethyl carbonate) | 4° C. | 90° C. | — | $6.5 \times 10P^{-3}P$ S/cm |
| DEC (diethyl carbonate) | −43° C. | 126° C. | — | $2.9 \times 10P^{-3}P$ S/cm |
| EMC (ethyl methyl carbonate) | −55° C. | 109° C. | $1.1 \times 10P^{-3}P$ S/cm | $4.3 \times 10P^{-3}P$ S/cm |
| MA (methyl acetate) | −98° C. | 57° C. | $8.3 \times 10P^{-3}P$ S/cm | $17.1 \times 10P^{-3}P$ S/cm |
| MF (methyl formate) | −100° C. | 32° C. | $15.8 \times 10P^{-3}P$ S/cm | $28.3 \times 10P^{-3}P$ S/cm |

Of the five alkyl carbonates, propylene carbonate (PC) provides a relatively wide temperature range with reasonably high ionic conductivity. Because of its high reactivity with graphite, PC is not used in the graphite anode LIB cells which dominate the current commercial LIB markets. Electrolyte formulation in the current LIB cells typically utilizes multiple solvents, often binary or ternary, because they provide better cell performance, higher conductivity, and a broader temperature range than a single solvent electrolyte. Multi-solvent formulations often include ethylene carbonate (EC) which has low reactivity and high conductivity. The high melting temperature of EC (39° C.) may be problem-some even for commercial batteries, but it becomes less of an issue when EC is mixed with other low melting temperature solvents. The conductivity of 1M $LiPFR_6R$ solutions using typical binary and ternary solvent mixtures is compared in Table 5.

For sufficiently high ionic conductivity (which determines high-rate capability) and low melting temperature (which determines low-temperature operating capability), EC-EMC or EC-DMC-EMC may be used, especially if graphite is used as the anode. The use of PC and non-carbonate solvents (such as MA) is not recommended because these solvents are not compatible with graphite and their stability with non-graphite anodes is not fully known.

TABLE 6

Conductivity of $LiPFR_6R$ solutions using typical binary and ternary solvent mixture

| Solvents (wt. ratio) and conc. | Ionic conductivity of 1M $LiPFR_6$ | | |
|---|---|---|---|
| | at −40° C. | at 20° C. | at 80° C. |
| EC-DMC (1:1, for 1.25M $LiPFR_6R$) | $0.7 \times 10^{-3}P$ S/cm | $9.3 \times 10^{-3}P$ S/cm | $23.3 \times 10^{-3}P$ S/cm |
| EC-DEC (1:1) | $0.7 \times 10^{-3}P$ S/cm | $7.0 \times 10^{-3}P$ S/cm | $17.5 \times 10^{-3}P$ S/cm |
| EC-EMC (1:1) | $0.9 \times 10^{-3}P$ S/cm | $8.5 \times 10^{-3}P$ S/cm | $20.3 \times 10^{-3}P$ S/cm |
| EC-MA (1:1) | $3.8 \times 10^{-3}P$ S/cm | $17.1 \times 10^{-3}P$ S/cm | — |
| EC-PC-EMC (15:25:60) | $1.0 \times 10^{-3}P$ S/cm | $8.1 \times 10^{-3}P$ S/cm | $17.8 \times 10^{-3}P$ S/cm |
| EC-DMC-EMC (15:25:60) | $1.4 \times 10^{-3}P$ S/cm | $7.6 \times 10^{-3}P$ S/cm | $14.1 \times 10^{-3}P$ S/cm |

Current lithium ion battery technology does not allow battery charging at temperatures of below zero degrees C. In addition, lithium ion battery performance is significantly degraded at low temperatures, particularly at below zero degrees C. Technology for charging LIB's at very low temperatures has been developed and can be adapted to the LIB based reserve and platform and soldier lithium ion battery's disclosed herein to construct power systems for powering gun-fired and other munitions as well as various weapon and mobile and stationary platforms and soldier platforms.

Figure 24:
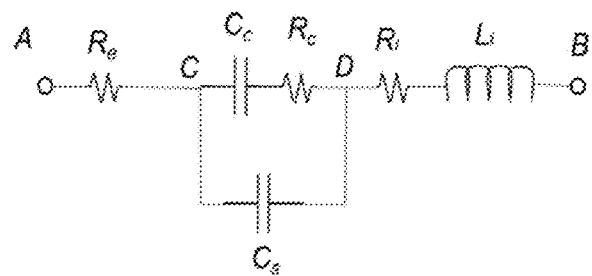
FIG. 24 illustrates an equivalent lumped model of a lithium ion battery.
Figure 25:
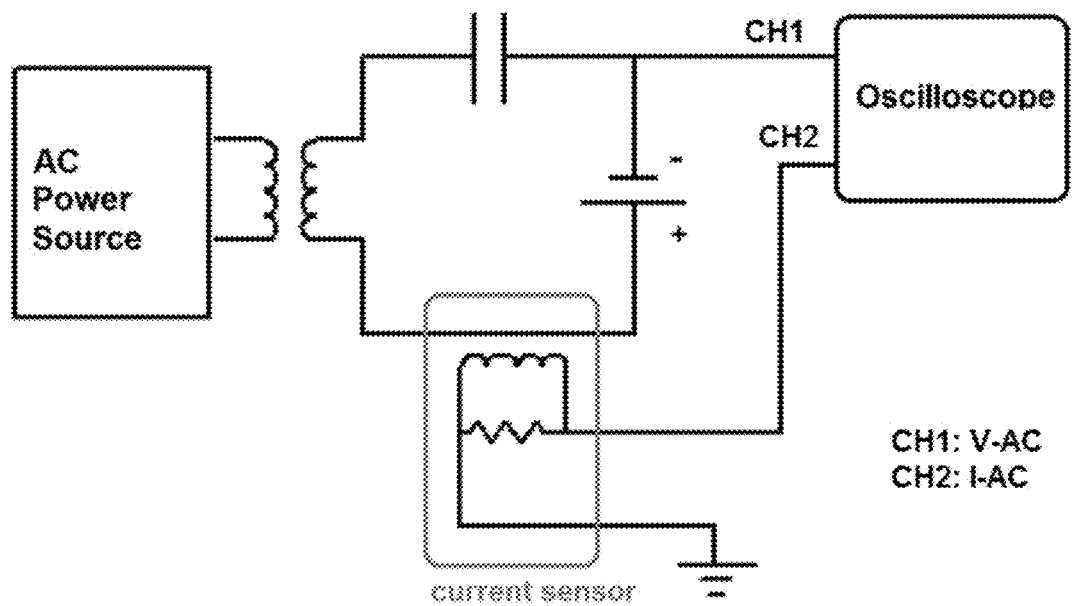
FIG. 25 illustrates the LIB electrolyte AC voltage heating circuit.
Figure 26:
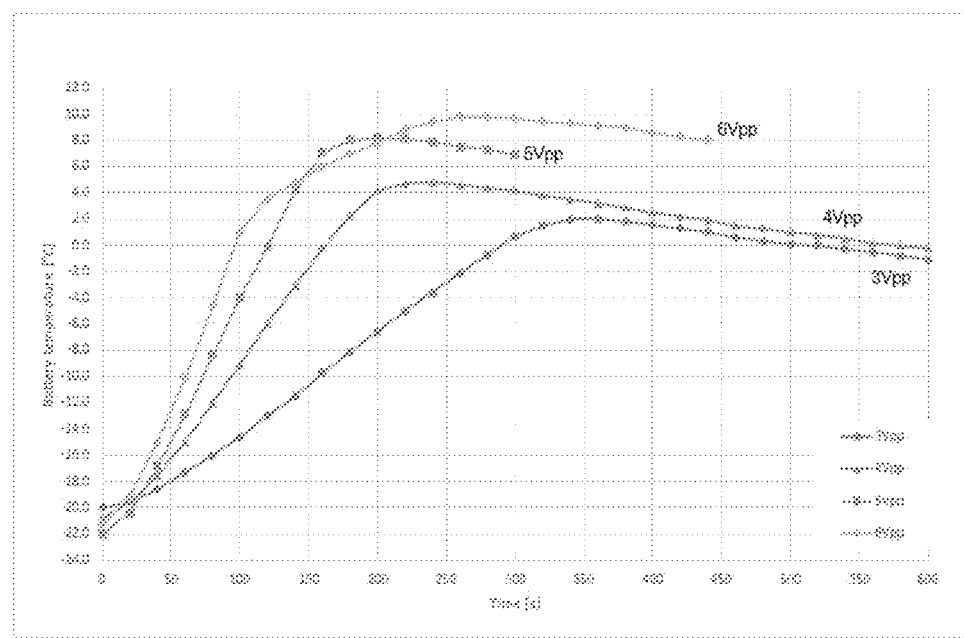
FIG. 26 illustrates a graph showing LIB electrolyte AC voltage heating at different peak voltages.

The basic operation of Lithium ion batteries may be approximately modeled with the equivalent (lumped) circuitry shown in FIG. 24. In this model, the resistor $R_e$ is considered to be the electrical resistance against electrons from freely moving in conductive materials with which the electrodes and wiring are fabricated. The equivalent resistor $R_i$ and $L_i$ represent the resistance to free movement of lithium ions by the battery electrolyte and equivalent inductance of the same, respectively. The capacitor $C_s$ is the surface capacitance, which can store electric field energy between electrodes, acting similar to parallel plates of capacitors. The resistor $R_c$ and capacitor $C_c$ represent the electrical-chemical mechanism of the battery in which $R_c$ is intended to indicate the electrical energy that is stored as chemical energy during the battery charging and that can be discharged back as electrical energy during the battery discharging, and $R_c$ indicates the equivalent resistance in which part of the discharging electrical energy is consumed (lost) and essentially converted to heat. The terminals A and B are intended to indicate the terminals of the lithium ion battery.

In the LIB model of FIG. 24, the components $R_i$, $R_c$ and $C_c$, are highly sensitive to temperature. In particular, at low temperature the resistance of the resistor $R_i$ increases due to the increase in the "viscous" resistance of the electrolyte to the movement of lithium ions. This increase in resistance causes higher losses during charging and discharging of the lithium ion battery. Low temperature charging passes (relatively high) currents through the indicated components $R_c$ and $C_c$ representing the battery electrical-chemical reactions, and is well known that results in so-called lithium plating, which is essentially irreversible, prevents battery charging and permanently damages the battery.

The method of charging LIB at low temperatures can be described as follows. Consider the circuit model of FIG. 24. If an AC current with high enough frequency is applied to the battery, due to the low impedance of the capacitor $C_s$, there will be no significant voltage drop across the capacitor, i.e., between the junctions C and D, and the circuit effectively behaves as if the capacitor $C_s$ were shorted. As a result, the applied high frequency AC current essentially passes through the resistors $R_e$ and $R_i$ and inductor $L_i$ and not through the $R_c$ and $C_c$ branch to damage the electrical-chemical components of the battery. Any residual current passing through the $R_c$ and $C_c$ branch would also not damage the battery due to its high frequency and zero DC component of the applied current. The high frequency AC current passing through the resistors $R_e$ and $R_i$ and inductor $L_i$ will then heat the battery core, thereby increasing its temperature. If the high frequency AC current is applied for long enough period of time, the battery core temperature will rise enough to make it safe to charge using the commonly used DC current methods.

Such method can also be used to bring up the LIB cell to room temperature or to the temperature at which the battery can operate efficiently and keep it at that temperature. Thus, the technology can be used in the proposed LIB based reserve as well as platform batteries.

The present technology has also been shown to be applicable to super-capacitors.

The following are some of the main characteristics of the LIB low temperature fast charging and performance enhancement method:
  It requires no modification to the Lithium-ion battery and the super-capacitor;
  Extensive tests have shown no damage to the battery and the super-capacitor;
  The Lithium-ion battery pack protection electronic unit can be modified to ensure continuous high performance operation at low temperatures. For example, the battery core can be automatically kept at zero degrees C. using the battery power;
  It eliminates the need for temperature sensors for measuring internal battery and super-capacitor temperature;
  The battery and super-capacitor electrolyte is directly and uniformly heated, therefore requiring significantly less electrical energy and significantly faster than if possible by external heating;
  Standard sized Lithium-ion batteries can be used instead of requiring thin and flat battery stack packaging for relatively rapid external heating via heating blankets or the like;
  The technology is simple to implement and low-cost.

The choice of proper solvents based on these properties and stability would allow for low-temperature operation of LIB (down to −40° C.). Another important factor, however, which is little known at such a low temperature, is intercalation kinetics. Sluggish intercalation kinetics would not facilitate high-rate charge/discharge even with high ionic conductivity. Considering this little known factor, a supporting device can be added to operate LIB at low temperatures (e.g. below 0° C.) continuously for a certain period of time (e.g. 30 days). The simplest device would be an auxiliary battery that provides a very small amount of current (which can be less than $mA/cm^2$ but sufficient to keep the LIB cells warm by joule heating) continuously after a long dormant period (up to 20 years). A good candidate is lithium iodine ($Li/IR_2R$) primary battery which is commercially used in medical device industry. The $Li/IR_2R$ battery was developed many decades ago and it is still the main power source for cardiac pacemakers. Its demonstrated life is 17 years, the longest of any batteries developed. If a small form factor $Li/IR_2R$ battery is attached to the LIB with good thermal and electrical insulation, it will provide a fraction of heat to maintain a critical temperature for LIB operation. The $Li/IR_2R$ battery is a solid-state battery with simple design and fabrication. It is a very low power battery that virtually eliminates any safety concern (and it is being used for medical applications).

Different salts including $LiPFR_6 R$ (melting point: 200P° PC), $LiCFR_3RSOR_3 R$(melting point: >300P° PC), $LiBFR_4 R$(melting point: >300P° PC) (melting point: >293P° PC), $LiClOR_4 R$(melting point: >236P° PC) as listed in Table 6, can be used based on chemical stability and melting point and ionic conductivity in different solvents.

TABLE 6

The physical properties of the lithium salts used in Li-ion battery electrolytes.

| Lithium salts | Melting point (P°PC) | Ionic conductivity at 25P°PC (S/cm) | Comments |
|---|---|---|---|
| $LiPFR_6$ | 200 | $5.8$~$10.7 \times 10P^{-3}$ | Most commonly used |
| $LiCFR_3RSOR_3$ | >300 | $3.5$~$4.8 \times 10P^{-3}$ | Usually used in polymer electrolytes |
| $LiBFR_4$ | 293 | $3.4$~$4.9 \times 10P^{-3}$ | Safer than $LiPFR_6$ |
| $LiClOR_4$ | 236 | $5.6$~$8.4 \times 10P^{-3}$ | Early used |
| $LiAsPFR_6$ | 340 | $5.7$~$11.1 \times 10P^{-3}$ | Toxic |

Different solvents including high boiling point EC (248P° PC), PC (242P° PC), and diethyl carbonate (DEC) (126P° PC), Tetraethylene glycol dimethyl ether (TEGDME) (275P° PC), Dimethyl ether (DME) (−24P° PC), etc. as listed in Table 7, can be combined with the lithium salts to form a highly thermal stable electrolyte for reserve batteries.

TABLE 7

The physical properties of solvents used in Li-ion battery electrolytes.

| Solvents | Melting point (P°PC) | Boiling point (P°PC) | Conductivity at 20P°PC (S/cm) |
|---|---|---|---|
| Ethylene carbonate (EC) | 39 | 248 | $6.9 \times 10P^{-3}$ |
| Propylene carbonate (PC) | −48 | 242 | $5.2 \times 10P^{-3}$ |
| Dimethyl carbonate (DMC) | 4 | 90 | $6.5 \times 10P^{-3}$ |
| Diethyl carbonate (DEC) | −43 | 126 | $2.9 \times 10P^{-3}$ |
| Ethyl methyl carbonate (EMC) | −55 | 109 | $4.3 \times 10P^{-3}$ |
| Tetraethylene glycol dimethyl ether (TEGDME) | −30 | 275 | $3.3 \times 10P^{-3}$ |
| Methyl acetate (MA) | −98 | 57 | $17.1 \times 10P^{-3}$ |
| Methyl formate (MF) | −100 | 32 | $28.3 \times 10P^{-3}$ |

Figure 27:
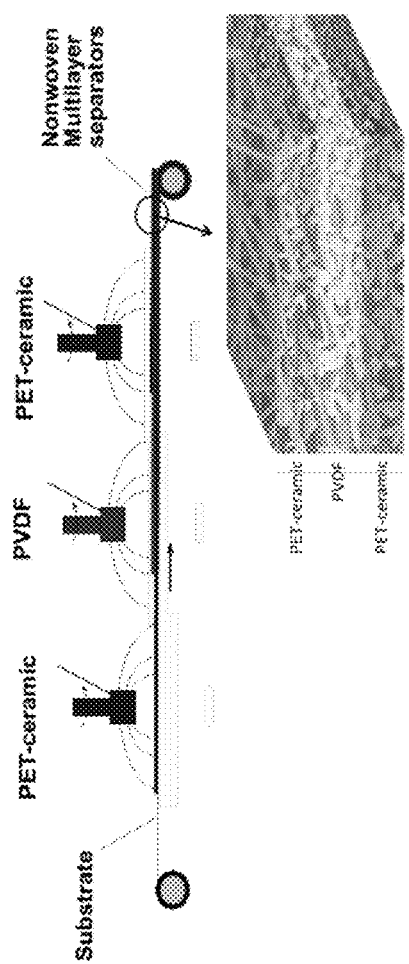
FIG. 27 illustrates a schematic of high-performance PET-ceramic/PVDF/PET-ceramic multilayer separators production process.

The LIB also includes a non-woven multilayer structural separator. Commercial inorganic particles such $SiOR_2R$, $AlR_2ROR_3R$ can be used as a ceramic filler. Ceramic particles/PET membranes can be prepared by using centrifugal spinning. PET solution (10~20 wt. %) can be prepared by dissolving PET into the mixture of trifluoroacetic acid (TFA)/1,2-dichloroethane (3:2, v/v). Inorganic particles/PET solutions can be prepared by adding different amounts of inorganic powders (5~15 wt. %) into the PET solution. All solutions are stirred mechanically prior to centrifugal spinning. The centrifugal spinning system with a DC motor can control the rotational speed by a speed controller. The rotational speed of the motor can be controlled at 1000~5000 rpm. The spinneret has a cylindrical shape with 2 cm in height, 1.5 cm in radius and 0.3 mm in wall thickness. Two nozzles with an inner diameter of 0.4 mm are located on the sidewall of the spinneret. The distance between the nozzle tip and the rod collector can be set to 10~20 cm. All the spinning operations can be conducted at room temperature. PVDF is firstly dissolved in the mixture of dimethylformamide (DMF) and acetone with a volume ratio of 1:1 to form PVDF solution (10~20 wt %), and then the solution sealed at room temperature for more than 40 hours with intensive mixing prior to centrifugal spinning. After preparing a PET/ceramic composite layer and PVDF shut-down layer, a sandwiched PET-ceramic/PVDF/PET-ceramic composite porous trilayer membrane is fabricated by the centrifugal spinning process using PET-ceramic, PVDF and PET-ceramic solutions separately in sequence. The centrifugal spinning system will be used as shown in FIG. 27. The flow rates of the PET-ceramic solution and PVDF solution will be controlled, respectively.

The morphology of the PET-ceramic/PVDF/PET-ceramic membrane can be checked by SEM/TEM. The cross-sectional view of the sample is prepared by immersing the membranes in deionized water and refrigerated at −18 P° PC overnight. Afterwards, the membranes are cut by a sharp cutter and heated at 60 P° PC for 2 hr in a dry oven. The tests on the ionic conductivity of the separator, over the temperature ranging from 30 to 70 P° PC, is measured using a sandwiched copper/separator/copper structure electrochemically over the frequency range from 1 to 100 K Hz with 5 mV of AC inputs. The thermal properties of the original separator is evaluated by differential scanning calorimetry (DSC) and thermal gravimetric analysis (TGA) from an ambient temperature to 600 P° PC at a heating rate of 10 P° PC/min in an argon atmosphere. The tensile strength is tested by a UTM4000 universal test machine.

In these efforts, the PET-ceramic/PVDF/PET-ceramic trilayer separators are optimized systematically by adjusting one or more of 1) the concentration of solutions; 2) ceramic powder content in solution, 3) centrifugal spinning system including rotating speed and collecting distance. The above change in centrifugal spinning system will result in a different diameter of nanofibers and a different thickness of each layer. The obtained series separators are characterized to reach optimal operation condition.

The electrochemical oxidation limits of liquid electrolyte soaked membranes will be determined by linear sweep voltammetry at room temperature. An asymmetric electrochemical cell consisting of stainless steel working electrode and lithium metal counter electrode can be used. The scan rate used can be 10 mVs and the potential range will be 2.5 to 6.0 V. The interfacial resistances between the liquid electrolyte soaked membranes and lithium metal can be investigated by measuring the impedances of symmetrical lithium cells with a frequency range of 1 MHz to 1 Hz. The charge/discharge tests of $Li/LiFePOR_4R$ cells containing liquid electrolyte-soaked membranes can be conducted by using coin-type cells. An Arbin automatic battery cycler can be used with a potential range of 4.2 e 2.5 V at a current density of 0.2 C to evaluate cycling performance. In addition, the cell performance including capacity, rate performance and cycling performance will be measured using a battery tester and an electrochemical workstation.

The novel charging methods for charging Li-ion batteries at sub-freezing temperatures also has widespread application for automobiles, in particular electric and hybrid vehicles. Although Li-ion batteries offer reasonably good charging performance at cooler temperatures and allow fast-charging in a temperature range of 5 to 45° C. (41 to 113° F.), charging should be reduced below 5° C., and manufacturers prohibit charging at freezing temperatures (0° C., 32° F.) or below. Most users of consumer electronics having Li-ion batteries are unaware that consumer-grade lithium-ion batteries cannot be charged below 0° C. (32° F.). Although the battery pack appears to be charging normally, plating of metallic lithium can occur on the anode during a subfreezing charge and permanently damage the battery. Some charger manufacturers sense the ambient temperature and prevent charging Li-ion batteries below freezing. Other charger manufactures allow charging Li-ion batteries below freezing, but at very low currents which can stretch the charge time for most devices to over 50 hours.

Electric and hybrid vehicle manufacturers make use of additional hardware for charging their Li-ion batteries in colder climates. For example, some electric and hybrid automobiles require a heating blanket to warm the Li-ion batteries above freezing prior to charging while others circulate warm cabin air through the batteries to raise their temperature. Since much of the country can experience sub-freezing temperatures (0° C., 32° F.) (and much lower temperatures) during the winter months, charging the Li-ion batteries in such environment is a significant obstacle to the widespread use of electric and hybrid automobiles in the future.

The novel charging methods for charging lithium-ion (Li-ion) batteries at sub-freezing temperatures also has application for consumer electronics (such as smart phones) and power tools that utilize such Li-ion batteries. This poses a problem in colder climates when such devices are used and charged in outdoor environments, such as with emergency personnel and construction workers.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for fabricating a Lithium-Ion reserve battery, the method comprising:
   assembling an operational Lithium-ion battery having an anode, cathode, separator membrane between the anode and cathode and an electrolyte;
   charging the assembled Lithium-ion battery;
   disassembling the Lithium-ion battery by separating the anode, cathode and separator membrane and removing the electrolyte;
   rinsing and drying the disassembled cathode and anode;
   reassembling the rinsed and dried cathode and anode with a new separator membrane between the anode and cathode and without the electrolyte to provide the Lithium-Ion reserve battery; and
   discharging the Lithium-Ion reserve battery.

2. The method of claim 1, further comprising, subsequent to the discharging, activating the Lithium-Ion reserve battery by adding the electrolyte.

3. The method of claim 2, wherein the activating comprises:
   storing the electrolyte in a container; and
   forcing the electrolyte from the container into the Lithium-Ion reserve battery upon a predetermined event.

4. The method of claim 2, further comprising heating the electrolyte when activating the Lithium-Ion reserve battery.

* * * * *